(12) United States Patent
Ma

(10) Patent No.: US 9,031,349 B1
(45) Date of Patent: May 12, 2015

(54) MEDIAN FILTER FOR IMAGE PROCESSING

(71) Applicant: The MathWorks, Inc., Natick, MA (US)

(72) Inventor: Jing Ma, Shrewsbury, MA (US)

(73) Assignee: The MathWorks, Inc., Natick, MA (US)

( * ) Notice: Subject to any disclaimer, the term of this patent is extended or adjusted under 35 U.S.C. 154(b) by 121 days.

(21) Appl. No.: 13/911,627

(22) Filed: Jun. 6, 2013

(51) Int. Cl.
*G06K 9/40* (2006.01)
*H04N 5/21* (2006.01)

(52) U.S. Cl.
CPC ...................... *H04N 5/21* (2013.01)

(58) Field of Classification Search
CPC .... G06K 9/00711; G06T 1/20; G06T 3/4015; G06T 5/00; G06T 5/5002; G06T 5/005; G06T 5/20; G06T 5/50; G06T 7/004; G06T 7/206; G06T 2200/28; G06T 2207/20192; G06T 2207/10024; G06T 2207/20016; G06T 2208/28; H03H 17/0263; H04N 5/217; H04N 5/357; H04N 5/3675; H04N 9/045; H04N 19/00909; H04N 2101/00; H04N 2209/046; G06F 7/22; G06F 7/24; G06F 7/544; G06F 7/607; G06F 17/18; G06F 17/30811; G06F 17/30843
See application file for complete search history.

(56) References Cited

U.S. PATENT DOCUMENTS

| | | | | |
|---|---|---|---|---|
| 6,760,737 | B2 * | 7/2004 | Jiang | 708/202 |
| 7,050,647 | B2 * | 5/2006 | Yamazaki | 382/262 |
| 8,321,490 | B2 * | 11/2012 | Wilson et al. | 708/304 |

OTHER PUBLICATIONS

Smith, "Implementing Median Filters in XC400E FPGAs", XILINX, 1 page, Oct. 1996.
Szedo, Two-Dimensional Rank Order Filter, XILINX, XAPP953 (v1.1), Sep. 21, 2006, 17 pages.
"Finding the Median in Linear Time", http://valis.cs.uiuc.edu/~sariel/research/CG/applets/linear_prog/median.html, printed Jun. 4, 2013, 1 page.
Zeno, "A reference of the best-known sorting networks for up to 16 inputs", http://www.angelfire.com/blog/ronz/Articles/999SortingNetworksReferen.html, May 11, 2002, 2 pages.
Batcher "Sorting networks and their applications", AFIPS Conference Proceedings vol. 32, 1968, Spring Joint Computer Conference Apr. 30-May 2, pp. 307-314.

* cited by examiner

*Primary Examiner* — Jose Couso
(74) *Attorney, Agent, or Firm* — Harrity & Harrity, LLP

(57) ABSTRACT

A device determines multiple sets of parameter values associated with an array of pixels to be used to process an image. Each set of parameter values corresponds to a set of pixels, included in the array, that are aligned along a first dimension of the array. The device determines a set of median values corresponding to each of the multiple sets of parameter values. The device determines a median of medians value that is a median of the set of median values. The device excludes a portion of parameter values, included in the multiple sets of parameter values, from a comparison set used to determine an overall median value, and determines a first median parameter value of the comparison set. The device determines the overall median value based on comparing the first median parameter value and the median of medians value, and provides the overall median value.

20 Claims, 12 Drawing Sheets

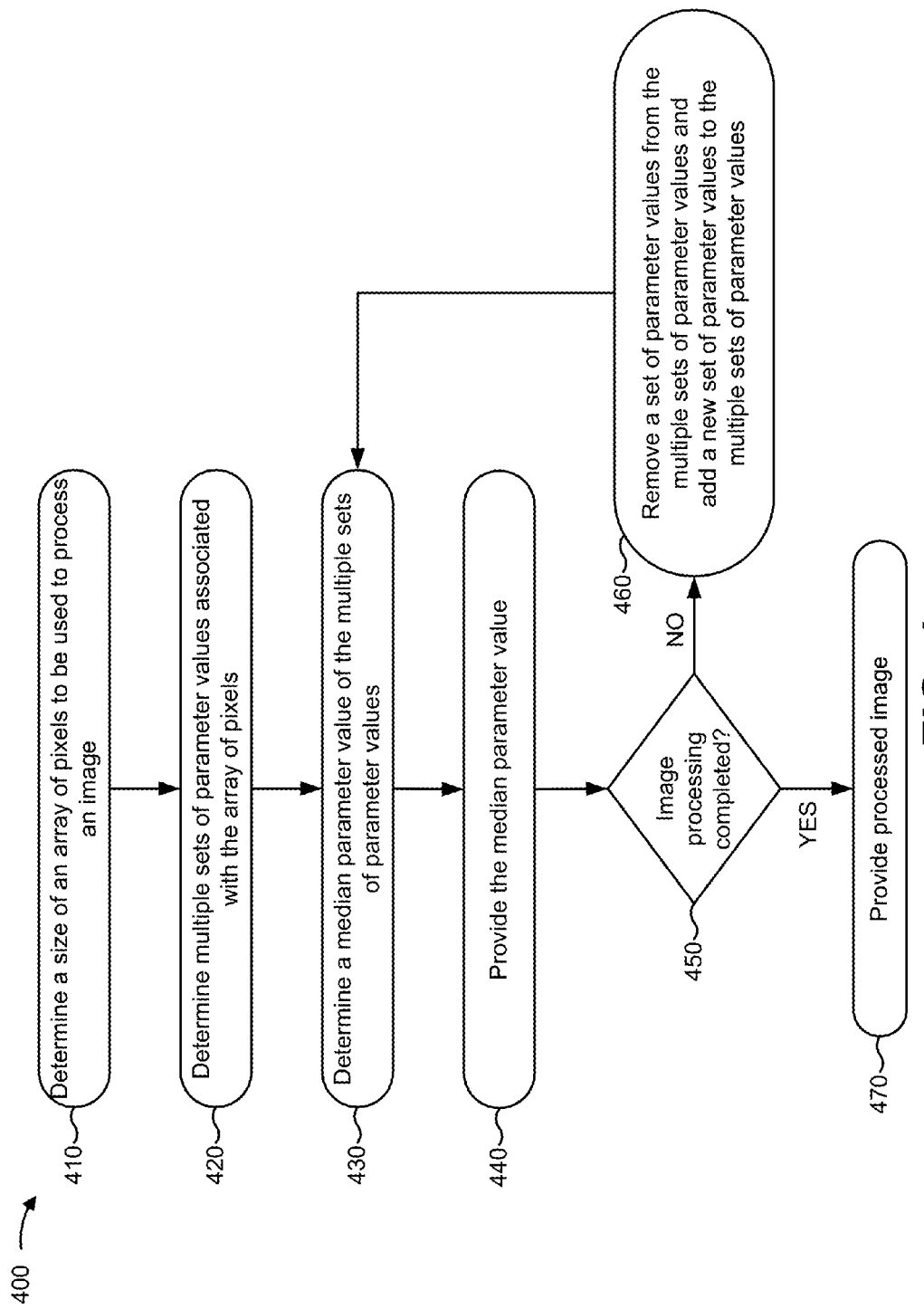

MEDIAN FILTER FOR IMAGE PROCESSING

BRIEF DESCRIPTION OF THE DRAWINGS

FIG. 4 is a flow chart of an example process for processing an image using a median filter;

DETAILED DESCRIPTION

The following detailed description of example implementations refers to the accompanying drawings. The same reference numbers in different drawings may identify the same or similar elements.

Median filtering is a technique used in image processing and video processing, and may be used to remove noise and preserve sharp edges in images. A median filter may operate by determining parameter values for pixels in a neighborhood surrounding a central pixel, determining a median value of those parameter values, and replacing the parameter value of the central pixel with the median value. In this way, median filtering may reduce noise in an image by modifying a parameter value (e.g., intensity) of a pixel that varies from parameter values of surrounding pixels.

A device utilizing median filtering may perform a large quantity of mathematical operations, such as comparisons between parameter values, to determine the median value. Performing large quantities of comparisons may be inefficient, particularly when performed using hardware description language (HDL) customized for a particular device. Implementations described herein may decrease the quantity of comparisons needed to determine a median parameter value for a neighborhood of pixels, thus saving hardware resources (e.g., comparators, multiplexers, storage, computing power, etc.).

Figure 1:
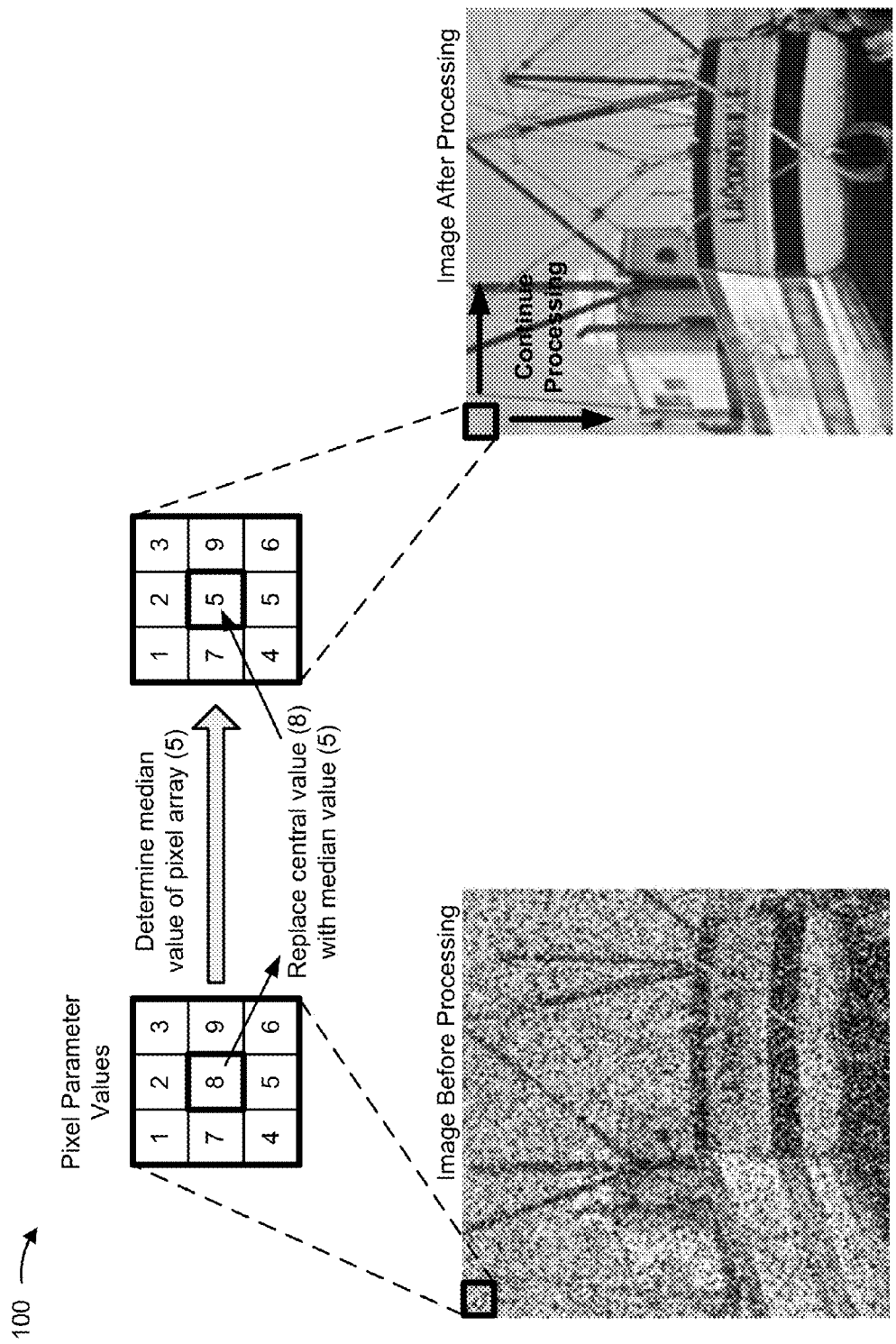
FIG. 1 is a diagram of an overview of an example implementation described herein.

FIG. 1 is a diagram of an overview of an example implementation 100 described herein. As shown in FIG. 1, an image may appear to be grainy due to noise included in the image. The noise may be due to random fluctuations in a signal that carries information regarding a parameter value for a pixel. To reduce the noise in the image, a filter device (e.g., a computer, an image processing device, etc.) may process the image using median filtering.

As shown, the filter device may determine parameter values for an array of pixels in the image. A parameter value of a pixel may represent, for example, an intensity of the pixel. The array of pixels may surround a central pixel, shown as having a parameter value of eight (8). The filter device may determine a median value of the parameter values associated with the pixels in the array of pixels (here, a 3×3 array of pixels). For example, the parameter values may include nine (9) values numbered from one to nine (e.g., 1, 2, 3, 4, 5, 6, 7, 8, 9), and the filter device may determine that five (5) is the median value for the array of pixels. The filter device may replace the original parameter value associated with the central pixel (e.g., 8) with the median value (e.g., 5). The filter device may continue to process other arrays of pixels in this manner until the image has been fully processed. Such processing may reduce the amount of noise in the image, as shown.

Figure 2:
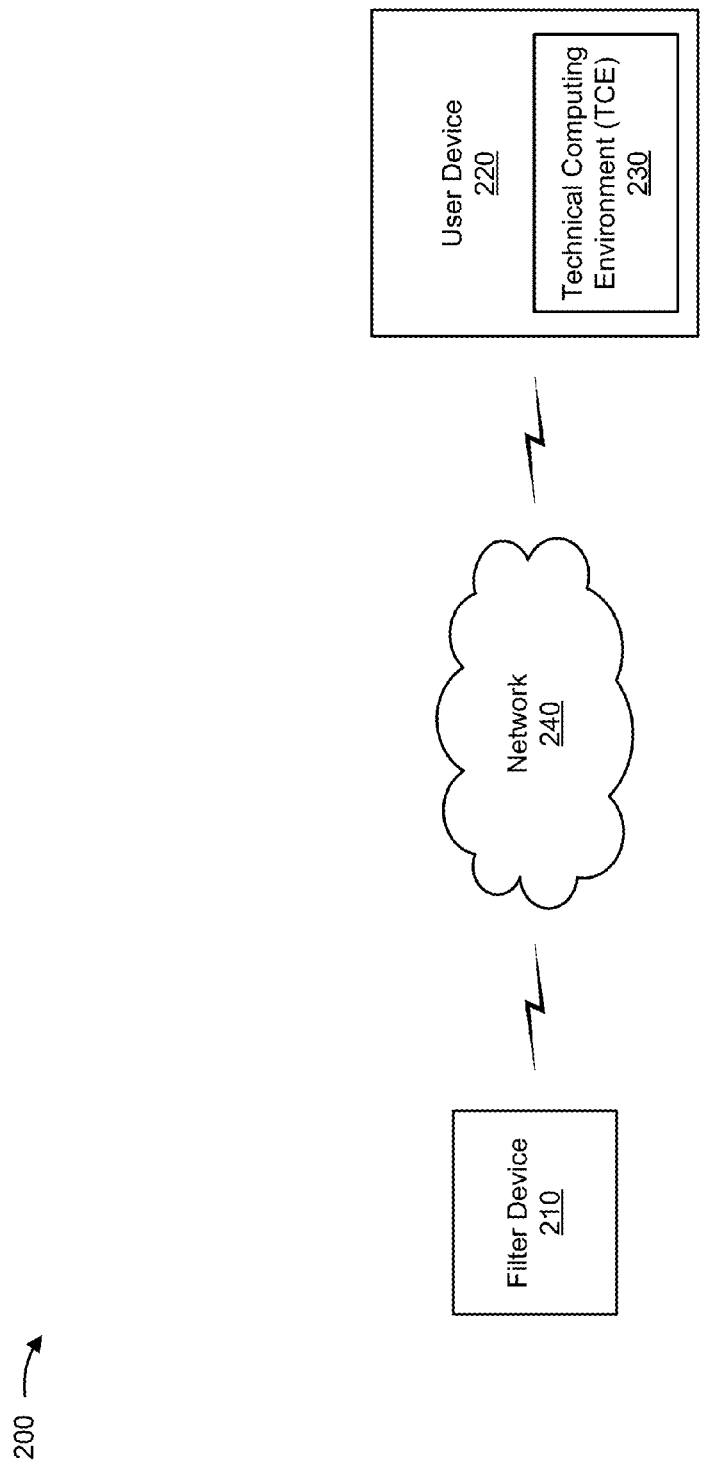
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a filter device 210, a user device 220, which may include a technical computing environment (TCE) 230, and a network 240. Devices of environment 200 may interconnect via wired connections, wireless connections, or a combination of wired and wireless connections.

Filter device 210 may include a device capable of processing and/or filtering an image. For example, filter device 210 may include a display device, an image processing device, a desktop computer, a laptop computer, a tablet computer, a handheld computer, a server, a mobile phone, a television, a monitor, a camcorder, a camera, a set-top box, a gaming device, or a similar device. In some implementations, filter device 210 may receive, generate, store, process, and/or provide an image and/or information associated with an image (e.g., a parameter value of a pixel included in the image, a median value associated with an array of pixels included in the image, etc.). Additionally, or alternatively, filter device 210 may receive information from and/or transmit information to user device 220 (e.g., an image and/or information associated with an image) and/or another device. In some implementations, filter device 210 may display a processed image and/or provide a processed image to another device for display. In some implementations, filter device 210 may include a device capable of compiling and/or executing HDL code (and/or other program code), which may be received from user device 220.

User device 220 may include one or more devices capable of receiving, generating, storing, processing, and/or providing an image and/or information associated with an image. For example, user device 220 may include a computing device, a server, a desktop computer, a laptop computer, a tablet computer, a handheld computer, or a similar device. In some implementations, user device 220 may provide an image and/or information associated with an image (e.g., a parameter value of a pixel included in the image, a median value associated with an array of pixels included in the image, information associated with a median filter algorithm, etc.) to filter device 210. For example, user device 220 may generate HDL code for filtering an image (e.g., using a median filter), and may provide the HDL code to filter device 210.

User device 220 may host TCE 230. TCE 230 may include any hardware-based component or a combination of hardware and software-based components that provides a computing environment that allows tasks to be performed (e.g., by users) related to disciplines, such as, but not limited to, mathematics, science, engineering, medicine, and business. TCE 230 may include a text-based environment (e.g., MATLAB® software), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a connection interface (e.g., a universal serial bus connection), and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
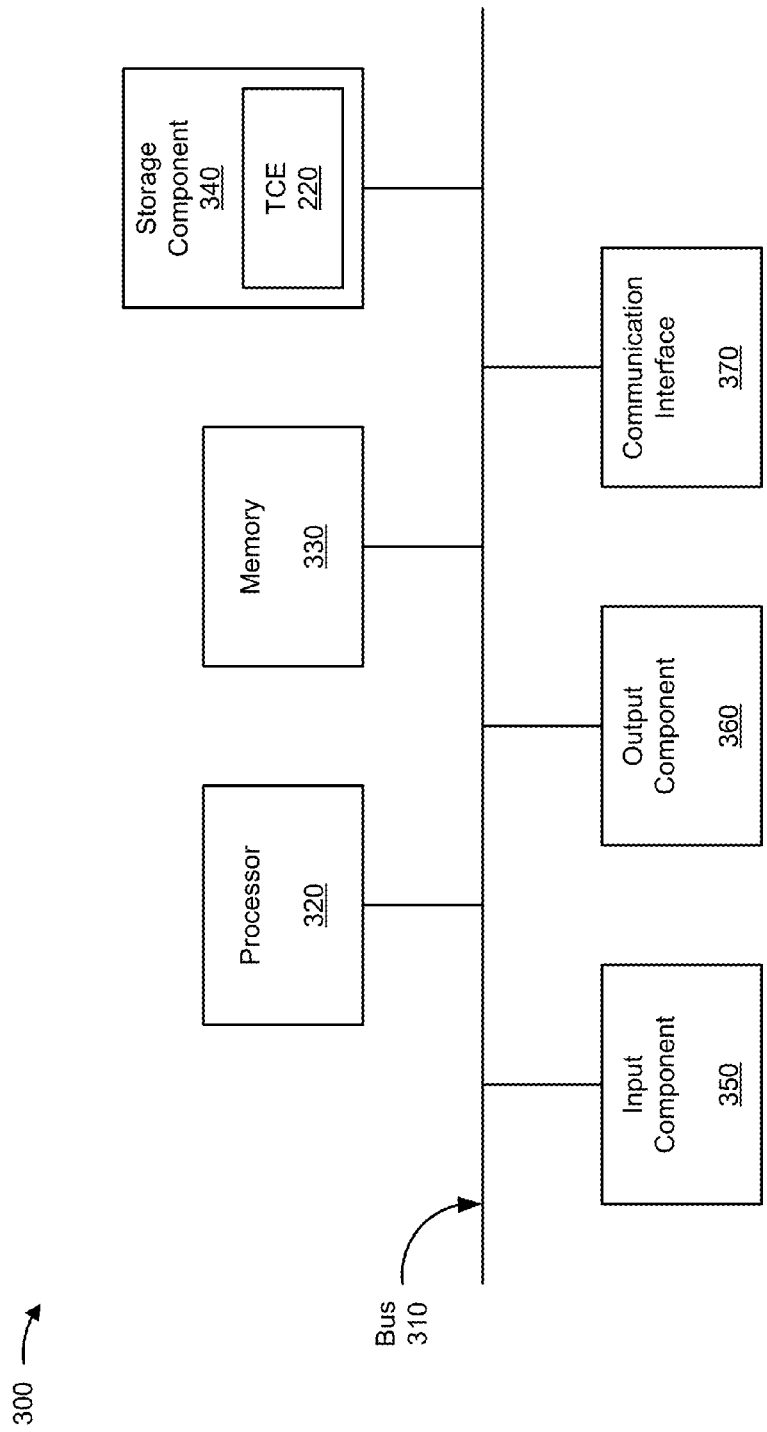
FIG. 3 is a diagram of example components of one or more devices of FIG. 2.

FIG. 3 is a diagram of example components of a device 300, which may correspond to filter device 210 and/or user device 220. In some implementations, each of filter device 210 and/or user device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 230.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330 and/or storage component 340. A computer-readable medium may be defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for processing an image using a median filter. In some implementations, one or more process blocks of FIG. 4 may be performed by filter device 210. In some implementations, one or more process blocks of FIG. 4 may be performed by another device or a group of devices separate from or including filter device 210, such as user device 220.

As shown in FIG. 4, process 400 may include determining a size of an array of pixels to be used to process an image (block 410). For example, filter device 210 may receive, from a user and/or another device, information that identifies a size of an array of pixels to be used to process an image. The image may include a two-dimensional image (e.g., a digital photograph, a digital picture, etc.), a three-dimensional image (e.g., a three-dimensional model, etc.), a segment of a video (e.g., a frame or a still image included in a video), or the like. The array of pixels may include a two-dimensional array (e.g., an m×n array, where m and n may be the same value or different values), a three-dimensional array (e.g., an m×n×z array, where two or more of m, n, and z may be the same value or different values), or the like.

While some implementations are described herein with respect to pixels and/or arrays of pixels, other implementations may include scalar values and/or arrays of scalar values. A scalar value may refer to, for example, a picture element (e.g., a pixel), a volume element (e.g., a voxel or a three-dimensional analogue of a two-dimensional pixel), a surface element (e.g., a surfel), a textual element (e.g., a texel), a lux element (e.g., a luxel), a resolution element (e.g., a resel), or the like.

In some implementations, the array of pixels may include a two-dimensional array of adjacent pixels aligned along a first dimension (e.g., a column) and adjacent pixels aligned along a second dimension (e.g., a row). The array of pixels may be represented as an m×n array, where m is greater than or equal to one, and where n is greater than or equal to one. Filter device 210 may receive information identifying a size of the array, such as a value for m (e.g., a quantity of pixels aligned along the first dimension), a value for n (e.g., a quantity of pixels aligned along the second dimension), a quantity of elements included in the array (e.g., a quantity of pixels, equal to m times n), or the like.

In some implementations, filter device 210 may determine the size of the array of pixels based on a size, a resolution, and/or a quantity of pixels included in the image to be processed. For example, filter device 210 may use a larger array for an image that includes a larger quantity of pixels as compared to an image that includes a smaller quantity number of pixels.

As further shown in FIG. 4, process 400 may include determining multiple sets of parameter values associated with the array of pixels (block 420). For example, filter device 210 may determine multiple sets of parameter values, where each set of parameter values corresponds to a set of pixels aligned along one dimension of the array of pixels. A parameter value, as used herein, may refer to a value that specifies a manner in which a pixel appears. For example, the parameter value may specify an intensity of a pixel (e.g., a brightness of a pixel, a value of a gray tone for a pixel), a color of a pixel (e.g., one or more red-green-blue RGB values for a pixel), or the like.

In some implementations, filter device 210 may determine a parameter value for each pixel in the array of pixels. For example, filter device 210 may determine an m×n array of parameter values corresponding to an m×n array of pixels. Filter device 210 may group the parameter values into sets along a dimension of the array. For example, filter device 210 may determine m sets of n parameter values (e.g., m arrays of parameter values, with each array having a size of n×1) for the m×n array of pixels. Additionally, or alternatively, filter device 210 may determine n sets of m parameter values (e.g., n arrays of parameter values, with each array having a size of m×1) for the m×n array of pixels. In this way, each column (or row) of pixels in the array may correspond to a set of parameter values.

As further shown in FIG. 4, process 400 may include determining a median parameter value of the multiple sets of parameter values (block 430). For example, filter device 210 may determine a median parameter value of the array of parameter values corresponding to the array of pixels. A median parameter value, or median value, as used herein, may refer to the numerical value that separates a higher half of the parameter values from a lower half of the parameter values. For example, when the parameter values are arranged from lowest value to highest value (e.g., in ascending order) or from highest value to lowest value (e.g., in descending order), the median value may be the middle value when there is an odd number of values, and may be a mean of the two middle values when there is an even number of values. While implementations are described herein in connection with a median value, in some implementations, filter device 210 may determine a mean value (e.g., an average value) and/or a mode value (e.g., a value that appears most often in a set of values) rather than a median value.

In some implementations, filter device 210 may determine the median parameter value of the multiple sets of parameter values using a technique described herein in connection with FIGS. 6 and 7A-7D. Additionally, or alternatively, filter device 210 may determine the median parameter based on using one or more of a basic sorting algorithm, a merge sorting algorithm, and/or a linear median sorting algorithm.

A basic sorting algorithm may refer to, for example, an algorithm used to sort elements included in a set. For example, a basic sorting algorithm may include a bubble sort, a best known sorting network algorithm, or the like. A best known sorting network algorithm (e.g., an AKS sorting network), as used herein, may refer to an abstract mathematical model that includes comparators and wires, and that is used to sort a set of values. Each wire may be associated with a value, and each comparator may take one wire as an input and one wire as an output. When two values enter a comparator, the comparator may emit the lower value on the top wire, and the higher value on the bottom wire, thus sorting the values in ascending order from the top wire to the bottom wire.

A merge sorting algorithm may refer to, for example, an algorithm used to merge and sort elements included in multiple (e.g., two or more) sets. For example, a merge sorting algorithm may include an insertion sort, an odd-even merge sorting algorithm, or the like. An odd-even merge sorting algorithm (e.g., an odd-even sort), as used herein, may refer to a technique where a set of values is sorted by comparing all (odd, even)-indexed pairs of adjacent elements in the set and, if a pair is in the wrong order (e.g., the first is larger than the second for an ascending sort or the first is smaller than the second for a descending sort), the elements are switched. The next iterative step of the algorithm may compare and sort values for all (even, odd)-indexed pairs of adjacent elements. The algorithm may alternate between (odd, even)-indexed pairs and (even, odd)-indexed pairs until the set of elements is sorted (e.g., in ascending or descending order). Alternatively, the odd-even merge sorting algorithm may refer to Batcher's odd-even mergesort algorithm.

A linear median sorting algorithm, as used herein, may refer to an algorithm that divides an array into three portions (e.g., that creates three sets of values), such as a first subset, a second subset, and a comparison set. An example of a linear median sorting algorithm is described elsewhere herein.

As further shown in FIG. 4, process 400 may include providing the median parameter value (block 440). For example, filter device 210 may provide the median parameter value to assist in processing an image. In some implementations, filter device 210 may store the median parameter value. Additionally, or alternatively, filter device 210 may modify a parameter value of a pixel of interest in an array of pixels based on the median parameter value. For example, filter device 210 may replace the parameter value of the pixel of interest with the median parameter value, and may adjust the appearance of the pixel of interest (e.g., an intensity of the pixel, a color of the pixel, etc.) based on the median parameter value. A parameter value of the pixel of interest may be referred to herein as a parameter value of interest.

A pixel of interest, as used herein, may refer to a pixel for which a neighborhood of nearby (e.g., surrounding, adjacent, etc.) pixels is being analyzed to potentially replace a parameter value associated with the pixel of interest. In some implementations, a pixel of interest may refer to a central pixel in the center of an n×n array (e.g., a pixel located in a position where the row number of the pixel is equal to the column number of the pixel). Alternatively, a pixel of interest may be located in another position of the array (e.g., along an edge where the edge of an image is being analyzed, in a position other than the center where an m×n array is being analyzed and m is not equal to n, etc.).

As further shown in FIG. 4, process 400 may include determining whether image processing has been completed (block 450). For example, filter device 210 may determine whether median filtering of the image has been completed. In some implementations, the median filtering may be completed when filter device 210 has analyzed each pixel in the image, or has analyzed a predetermined portion of pixels in the image. For example, filter device 210 may process each pixel (and/or each predetermined pixel) as a pixel of interest in the array of pixels described herein.

As further shown in FIG. 4, if image processing is not completed (block 450-NO), then filter device 210 may remove a set of parameter values from the multiple sets of parameter values, and may add a new set of parameter values to the multiple sets of parameter values (block 460), and may return to block 430 to continue processing. For example, after determining and/or providing a median parameter value for a first array of pixels, filter device 210 may determine a median parameter value for a second array of different pixels. In some implementations, the second array of pixels may share some pixels in common with the first array of pixels. For example, the first array of pixels may surround a first pixel of interest, and the second array of pixels may surround a second pixel of interest that is adjacent to the first pixel of interest.

Filter device 210 may remove, from the multiple sets of parameter values, a set of parameter values on a first side of an array, and may add, to the multiple sets of parameter values, a set of parameter values on a second side (e.g., an opposite side) of the array of pixels. As an example, filter device 210 may analyze a first array of size 3×3 to determine a median parameter value for pixels included in the array. After determining the median parameter value, filter device 210 may remove parameter values in the leftmost column of the array (e.g., the leftmost column of size 3×1) from the multiple sets of parameter values. Filter device 210 may add parameter values associated with pixels appearing in a column to the right of the array (e.g., a column of size 3×1) to the multiple sets of parameter values. In this way, filter device 210 may consistently use an array of size 3×3 to process the image.

In some implementations, filter device 210 may change the original parameter value of the pixel of interest to the median parameter value, but may continue to store the original parameter value when processing a subsequent array of pixels. In this way, the change will not impact a subsequently determined median parameter value. Alternatively, filter device 210 may store the median parameter value in association with the pixel of interest, so that the change will impact a subsequently determined median parameter value.

As further shown in FIG. 4, if image processing is completed (block 450-YES), then filter device 210 may provide the processed image (block 470). For example, filter device 210 may provide the processed image (e.g., with modified parameter values) for display. Additionally, or alternatively, filter device 210 may store the processed image (e.g., information associated with pixels that form the processed image and/or parameter values of the pixels). Additionally, or alternatively, filter device 210 may provide information associated with the processed image (e.g., pixel parameter values) to another device for storage and/or display. In some implementations, the processed image may include a frame from a video. In this instance, filter device 210 may proceed to perform process 400 for a next frame in the video.

Although FIG. 4 shows example blocks of process 400, in some implementations, process 400 may include additional blocks, different blocks, fewer blocks, and/or differently arranged blocks than those depicted in FIG. 4. Additionally, or alternatively, one or more of the blocks of process 400 may be performed in parallel.

Figure 5A:
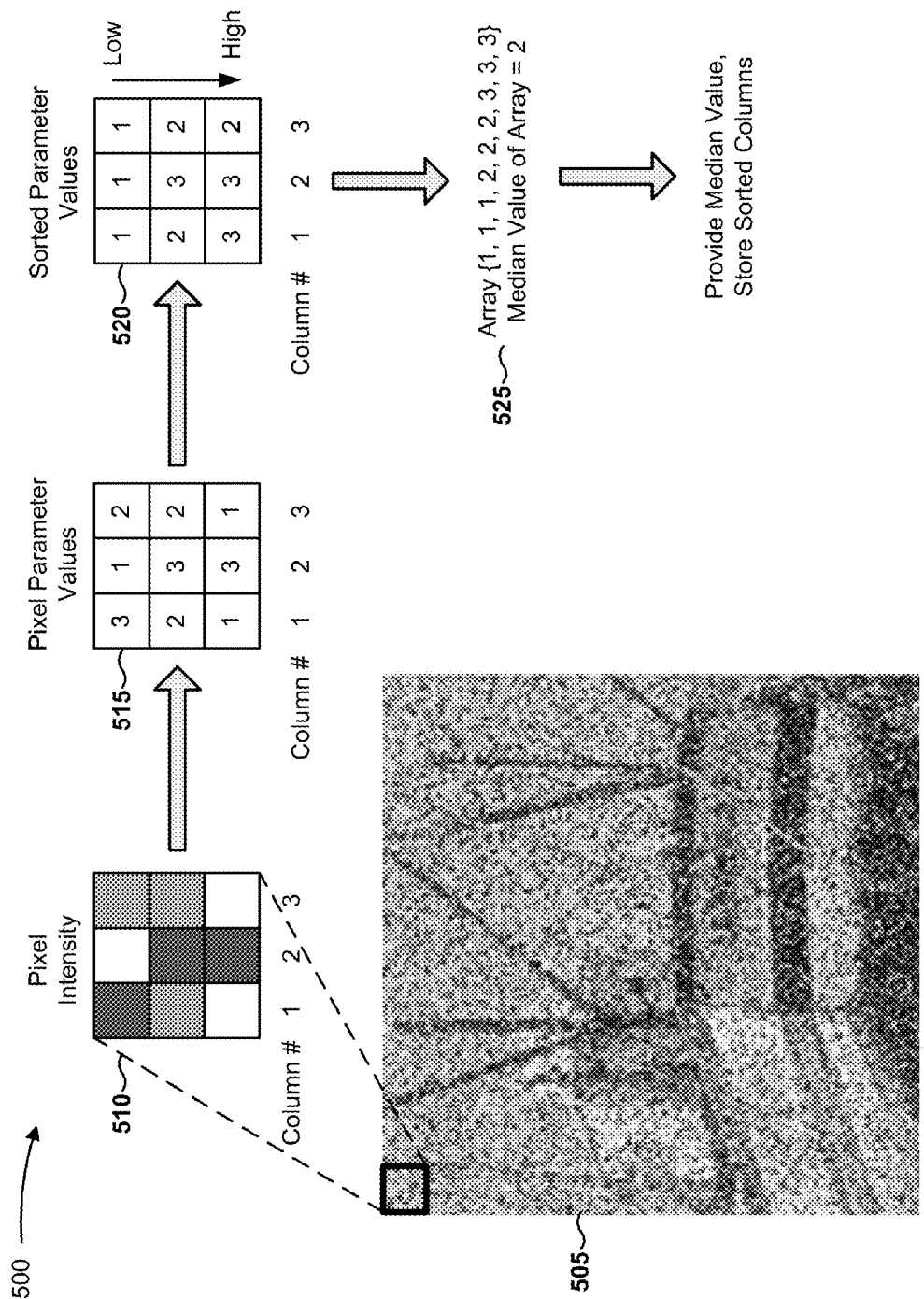
FIGS. 5A-5C are diagrams of an example implementation relating to the example process shown in FIG. 4.
Figure 5B:
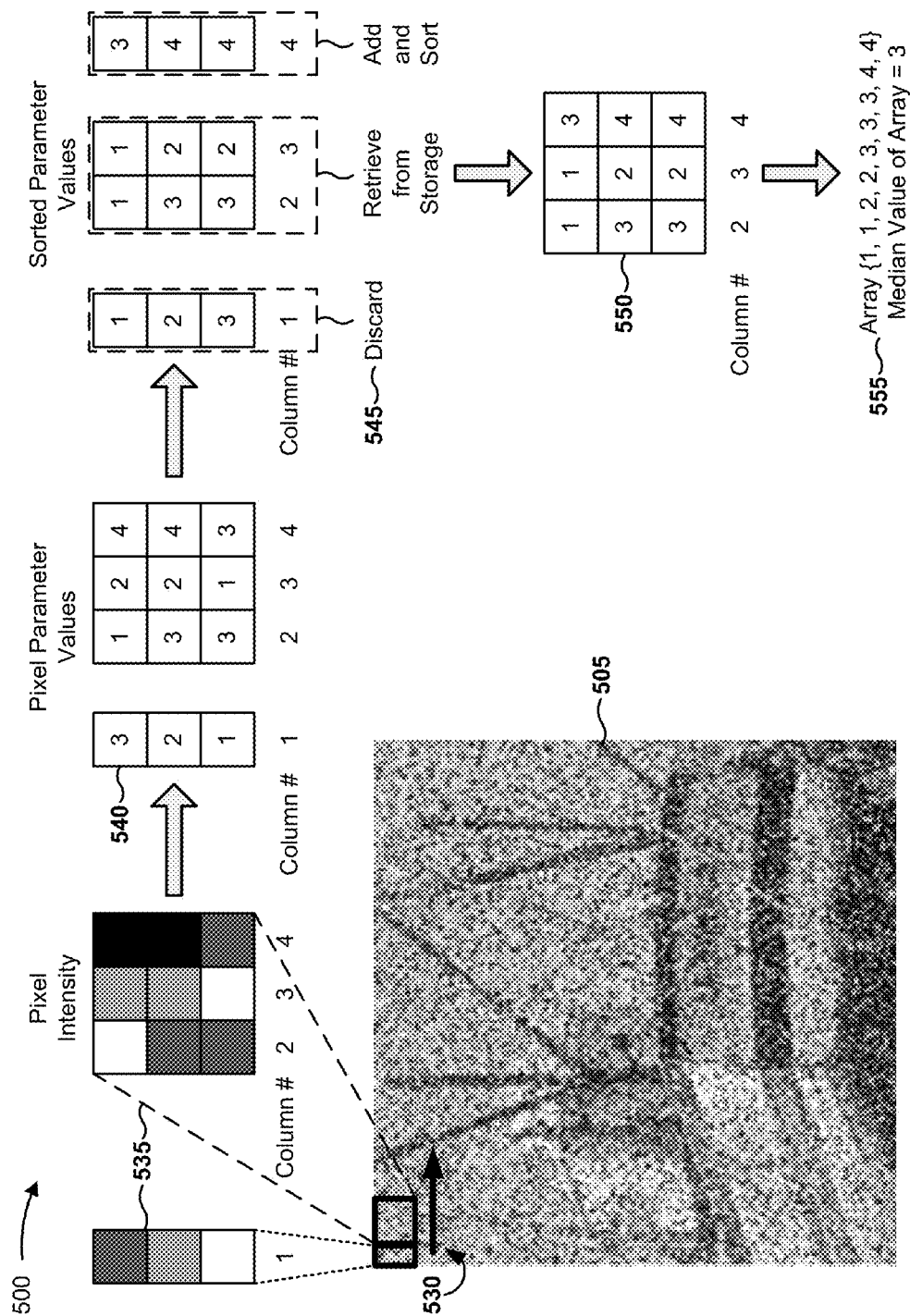
Figure 5C:
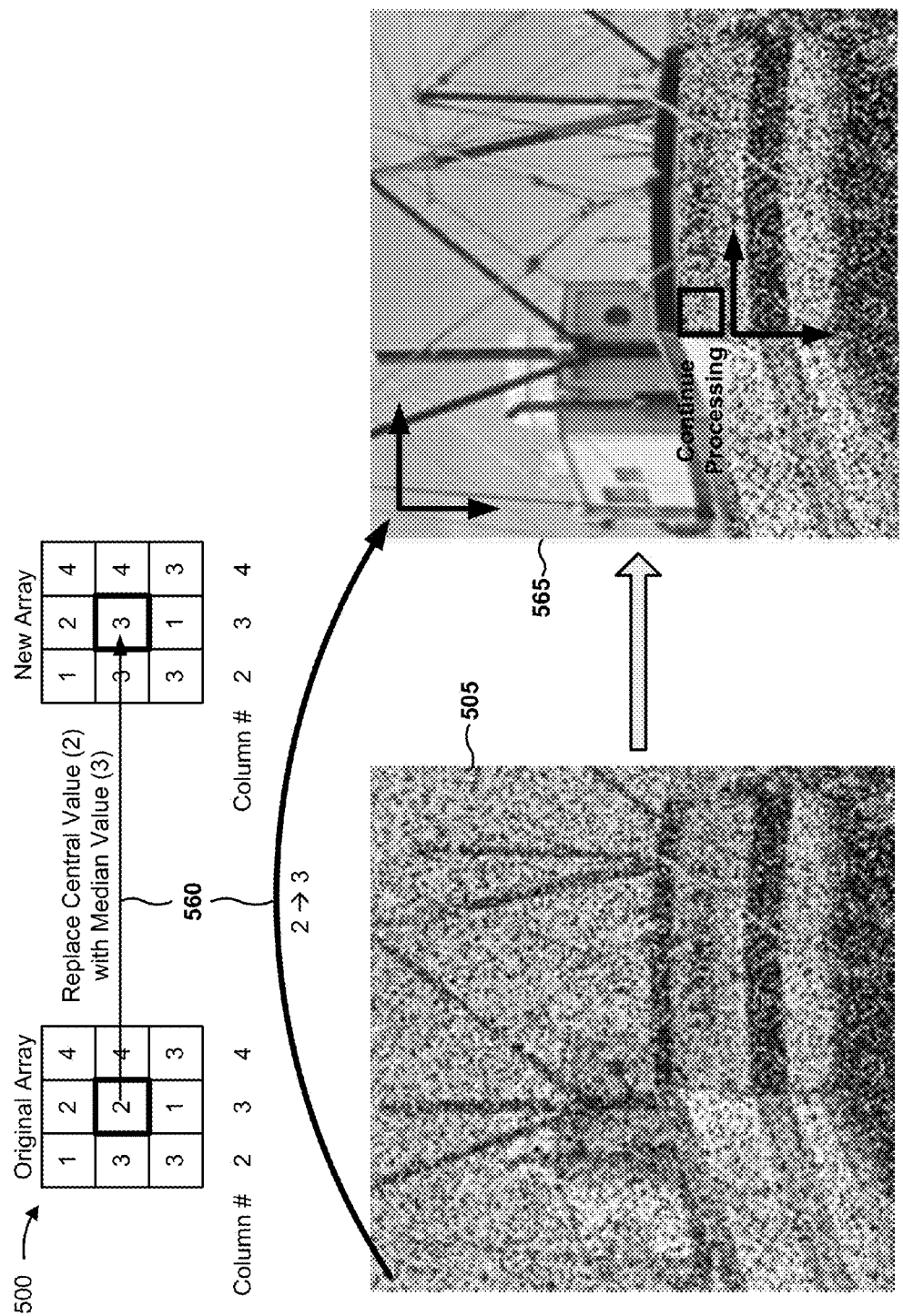

FIGS. 5A-5C are diagrams of an example implementation 500 relating to example process 400 shown in FIG. 4. In example implementation 500, assume that filter device 210 processes an image 505 using a median filtering technique described herein. As shown, image 505 may include noise that reduces the quality of image 505 (e.g., by making image 505 appear grainy).

As shown by reference number 510, assume that filter device 210 determines a 3×3 array of pixels included in image 505. Assume that the pixels have varying intensities and associated parameter values that control the intensity of the pixels (e.g., intensity values). As shown by reference numbers 510 and 515, a parameter value of 1 may correspond to a white pixel, a parameter value of 2 may correspond to a light gray pixel, and a parameter value of 3 may correspond to a dark gray pixel. Filter device 210 may generate a 3×3 array of parameter values that corresponds to the 3×3 array of pixels, as shown by reference number 515. The array of parameter values may be represented as follows:

$$\begin{bmatrix} 3 & 1 & 2 \\ 2 & 3 & 2 \\ 1 & 3 & 1 \end{bmatrix}.$$

As shown by reference number 520, filter device 210 may sort the parameter values within each column. For example, filter device 210 may sort the values of {3, 2, 1} in the first column in ascending order to generate a sorted first column of {1, 2, 3}. Filter device 210 may similarly sort the second column and the third column. For example, the array of sorted parameter values may be represented as follows:

$$\begin{bmatrix} 1 & 1 & 1 \\ 2 & 3 & 2 \\ 3 & 3 & 2 \end{bmatrix}.$$

Filter device 210 may use a technique described herein in connection with FIGS. 6 and 7A-7D to determine a median parameter value of the 3×3 array of parameter values. As shown by reference number 525, filter device 210 may determine that the median value is 2. Filter device 210 may provide the median value, such as by replacing the parameter value of the central pixel (3) with the median value (2). As further shown, filter device 210 may store the sorted columns (e.g., the sorted parameter values in columns 1, 2, and 3) and/or the sorted array of parameter values.

As shown in FIG. 5B (reference number 530), filter device 210 may determine a new 3×3 array of pixels included in image 505, such as by removing a column from the array and adding a new column to the array. As shown by reference number 535, assume that filter device 210 removes column 1 from the array, and adds column 4 to the array. As shown by reference numbers 535 and 540, a parameter value of 4 may correspond to a black pixel.

Recall from FIG. 5A that the sorted parameter values included in columns 2 and 3 (and optionally, column 1) were stored in memory. As shown by reference number 545, filter device 210 may not need to sort the parameter values included in columns 2 and 3, as filter device 210 may retrieve the sorted parameter values from memory. As further shown by reference number 545, filter device 210 may discard the sorted parameters included in column 1 (e.g., may delete the sorted parameter values from memory), and may sort the parameter values included in new column 4. As shown by reference number 550, the new array of sorted parameter values may be represented as follows:

$$\begin{bmatrix} 1 & 1 & 3 \\ 3 & 2 & 4 \\ 3 & 2 & 4 \end{bmatrix}.$$

Filter device 210 may use a technique described herein in connection with FIGS. 6 and 7A-7D to determine a median parameter value of the new 3×3 array of parameter values. As shown by reference number 555, filter device 210 may determine that the median value is 3. Filter device 210 may provide the median value, such as by replacing the parameter value of the central pixel (2) with the median value (3). As further shown, filter device 210 may store the sorted columns (e.g., the sorted parameter values in columns 2, 3, and 4) and/or the sorted array of parameter values, and may continue processing the image in this manner.

As shown in FIG. 5C, filter device 210 may process the image by replacing a central value (e.g., a parameter value associated with a central pixel in the 3×3 array of pixels) with the median value. For example, as shown by reference number 560, filter device 210 may replace the central value of 2 with the median value of 3 for the new array described above in connection with FIG. 5B. As shown by reference number 565, filter device 210 may continue processing image 505 to reduce noise and provide a clearer image.

As indicated above, FIGS. 5A-5C are provided as an example. Other examples are possible and may differ from what was described with regard to FIGS. 5A-5C.

Figure 6:
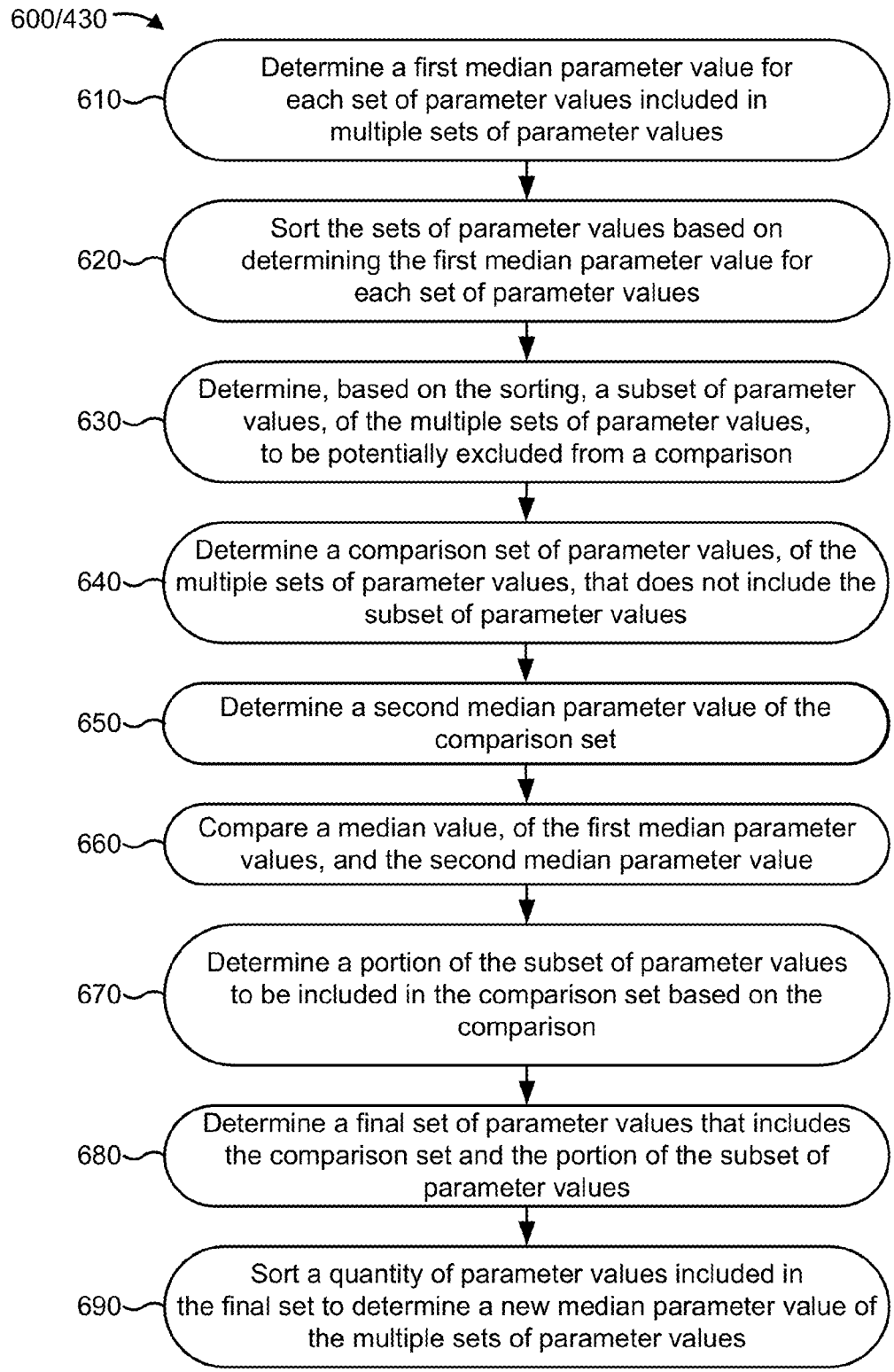
FIG. 6 is a flow chart of an example process for determining a median parameter value for an array of pixels.

FIG. 6 is a flow chart of an example process 600 for determining a median parameter value for an array of pixels. As shown, process 600 may correspond to block 430 (FIG. 4). In some implementations, one or more process blocks of FIG. 6 may be performed by filter device 210. In some implementations, one or more process blocks of FIG. 6 may be performed by another device or a group of devices separate from or including filter device 210, such as user device 220.

As shown in FIG. 6, process 600 may include determining a first median parameter value for each set of parameter values included in multiple sets of parameter values (block 610). For example, filter device 210 may determine a first median parameter value for each set of parameter values included in multiple sets of parameter values associated with an array of pixels. Each set of parameter values may correspond to a set of pixels aligned along one dimension of the array of pixels (e.g., a first dimension, a second dimension, a row, a column, etc.). For example, filter device 210 may determine a median value of a set of parameter values associated with pixels arranged in a single column. In some implementations, filter device 210 may determine the median value by sorting the set of parameter values (e.g., using a basic sorting algorithm) and determining the middle parameter value (e.g., the median).

For example, assume that a 3×3 array of pixels is represented by the following array of parameter values:

$$\begin{bmatrix} 3 & 1 & 2 \\ 2 & 3 & 2 \\ 1 & 3 & 1 \end{bmatrix}.$$

This example includes three sets of parameter values, represented by three columns: {3, 2, 1}, {1, 3, 3,}, and {2, 2, 1}. Filter device 210 may sort each set of parameter values to determine a first median value for each set. For example, assume that filter device 210 sorts the three columns to generate the following three sets of sorted parameter values: {1, 2, 3}, {1, 3, 3}, and {1, 2, 2}. The sorted sets of parameter values may be represented by the following array of parameter values:

$$\begin{bmatrix} 1 & 1 & 1 \\ 2 & 3 & 2 \\ 3 & 3 & 2 \end{bmatrix}.$$

The middle row (e.g., the second row) of the above array represents the first median values for each set of parameter values. The first median parameter value for the first set of parameter values (e.g., the first column) is 2, the first median parameter value for the second set of parameter values (e.g., the second column) is 3, and the first median parameter value for the third set of parameter values (e.g., the third column) is 2.

As further shown in FIG. 6, process 600 may include sorting the sets of parameter values based on determining the first median parameter value for each set of parameter values (block 620). For example, filter device 210 may sort the sets of parameter values by sorting the first median parameter values determined for each set of parameter values. In some implementations, filter device 210 may determine a median of medians values (also referred to herein as a "median of medians"). As used herein, a median of medians value may refer to a median value of the median parameter values determined for each set of parameter values (e.g., a median value of the first median values). Filter device 210 may determine the median of medians by sorting the first median parameter values and determining the middle first median parameter value (e.g., the median of the first median parameter values).

In some implementations, filter device 210 may rearrange the array of parameter values based on sorting the first median parameter values. Continuing with the example described above, filter device 210 may rearrange the sorted sets of parameter values as follows:

$$\begin{bmatrix} 1 & 1 & 1 \\ 2 & 2 & 3 \\ 3 & 2 & 3 \end{bmatrix}.$$

In the above array, the columns remain sorted in ascending order from top to bottom. However, columns 2 and 3 have been switched so that the median values of each set are arranged in ascending order from left to right (e.g., the middle row of 2, 2, 3).

As further shown in FIG. 6, process 600 may include determining, based on the sorting, a subset of parameter values, of the multiple sets of parameter values, to be potentially excluded from a comparison (block 630). For example, filter device 210 may determine a subset of parameter values, of the multiple sets of parameter values, to be potentially excluded from a comparison used to determine a new median parameter value of the multiple sets of parameter values (e.g., a median value of the array of parameter values). In some implementations, filter device 210 may determine the subset to be potentially excluded based on sorting the first median parameter values (e.g., based on sorting the sets of parameter values) and/or based on determining the median of medians.

In some implementations, filter device 210 may determine a first subset of parameter values to be potentially excluded from the comparison based on the median of medians. The first subset of parameter values may include parameter values that are less than or equal to the median of medians. Filter device 210 may determine the first subset based on a position of the parameter values in the array.

For example, in the below array of sorted sets of parameter values:

$$\begin{bmatrix} 1 & 1 & 1 \\ 2 & 2 & 3 \\ 3 & 2 & 3 \end{bmatrix},$$

the median of medians is 2, located in the center of the array. Every value to the left of the median of medians in the same row (here, a value of 2 in column 1, row 2) will be less than or equal to the median of medians because the first median parameter values (e.g., the middle row) has been sorted in ascending order from left to right. Further, every value above the median of medians in the same column (here, a value of 1 in column 2) will be less than or equal to the median of medians because each column has been sorted in ascending order from top to bottom. Further, every value located both above and to the left of the median of medians (here, a value of 1 in the top left corner) will be less than or equal to the median of medians, again due to the sorting. Thus, the three values of 1 (located in row 1, column 1), 1 (located in row 1, column 2), and 2 (located in row 2, column 1) are less than or equal to the median of medians, and form a first subset of values to be potentially excluded from the comparison.

In some implementations, filter device 210 may determine a second subset of parameter values to be potentially excluded from the comparison based on the median of medians. The second subset of parameter values may include parameter values that are greater than or equal to the median of medians. Filter device 210 may determine the second subset based on a position of the parameter values in the array.

For example, in the below array of sorted sets of parameter values:

$$\begin{bmatrix} 1 & 1 & 1 \\ 2 & 2 & 3 \\ 3 & 2 & 3 \end{bmatrix},$$

the median of medians is 2, located in the center of the array. Every value to the right of the median of medians in the same row (here, a value of 3 in row 2) will be greater than or equal to the median of medians because the first median parameter values (e.g., the middle row) has been sorted in ascending order from left to right. Further, every value below the median of medians in the same column (here, a value of 2 in row 3, column 2) will be greater than or equal to the median of medians because each column has been sorted in ascending order from top to bottom. Further, every value located both below and to the right of the median of medians (here, a value of 3 in the bottom right corner) will be greater than or equal to the median of medians, again due to the sorting. Thus, the three values of 3 (located in row 3, column 3), 3 (located in row 2, column 3), and 2 (located in row 3, column 2) are greater than or equal to the median of medians, and form a second subset of values to be potentially excluded from the comparison.

In some implementations, filter device 210 may combine the first subset and the second subset to form the subset of parameter values to be potentially excluded from the comparison.

As further shown in FIG. 6, process 600 may include determining a comparison set of parameter values, of the multiple sets of parameter values, that does not include the subset of parameter values (block 640). For example, filter device 210 may determine the comparison set that does not include the subset of parameter values to be potentially excluded from the comparison. The comparison set may include every value in the multiple sets of parameter values that is not included in the first subset of parameter values or the second subset of parameter values.

For example, in the below array of sorted sets of parameter values:

$$\begin{bmatrix} 1 & 1 & 1 \\ 2 & 2 & 3 \\ 3 & 2 & 3 \end{bmatrix},$$

the upper left corner of $\{1, 1, 2\}$ forms the first subset to be potentially excluded, and the lower right corner of $\{2, 3, 3\}$ forms the second subset to be potentially excluded. Thus, the comparison set includes the values of $\{3, 2, 1\}$ that form a diagonal from the lower left hand corner to the upper right hand corner of the array.

Thus, filter device 210 may generate the comparison set by excluding values that appear in the same row as the median of medians (e.g., the middle row), the same column as the median of medians (e.g., the middle column), a lower row and a lower column (e.g., row 1 and column 1), and a higher row and a higher column (e.g., row 3 and column 3). In some implementations, filter device 210 may generate the comparison set in a similar manner when the rows and columns are sorted in a different manner (e.g., descending from left to right, descending from top to bottom, etc.).

As further shown in FIG. 6, process 600 may include determining a second median parameter value of the comparison set (block 650). For example, filter device 210 may determine a second median parameter value, which may refer to a median parameter value of the comparison set. In some implementations, filter device 210 may determine the second median parameter value by sorting the values in the comparison set (e.g., using a basic sorting algorithm), and determining the middle value of the comparison set (e.g., the median value).

For example, filter device 210 may sort the comparison set of $\{3, 2, 1\}$ to generate a sorted comparison set of $\{1, 2, 3\}$, and may determine that the value of 2 is the second median parameter value (e.g., the median parameter value of the comparison set).

As further shown in FIG. 6, process 600 may include comparing a median value, of the first median parameter values, and the second median parameter value (block 660), determining a portion of the subset of parameter values to be included in the comparison set based on the comparison (block 670), and determining a final set of parameter values that includes the comparison set and the portion of the subset of parameter values (block 680). For example, filter device 210 may compare the median of medians value (e.g., a median value of the set of first median parameter values) and the second median parameter value (e.g., a median value of the comparison set). Filter device 210 may compare the values to determine whether the median of medians value is greater than, less than, or equal to the second median parameter value. Filter device 210 may determine a portion of the subset of parameter values (e.g., the first subset or the second subset) to include in the comparison set based on comparing the median of medians value and the second median parameter value. In some implementations, filter device 210 may sort the determined portion of parameter values (e.g., may sort the first subset and/or the second subset).

For example, if the median of medians value is greater than the second median parameter value, then filter device 210 may include (e.g., may add, merge, etc.) the first subset of parameter values in the comparison set (e.g., the values less than or equal to the median of medians). Conversely, if the median of medians value is less than the second median parameter value, then filter device 210 may include (e.g., may add, merge, etc.) the second subset of parameter values in the comparison set (e.g., the values greater than or equal to the median of medians).

If the medians of medians value is equal to the second median parameter value, then filter device 210 may provide the median of medians value as the new median value for the array of parameter values. For example, in the below array of sorted sets of parameter values:

$$\begin{bmatrix} 1 & 1 & 1 \\ 2 & 2 & 3 \\ 3 & 2 & 3 \end{bmatrix},$$

the median value of the comparison set {1, 2, 3} (e.g., the second median parameter value) is equal to 2. The median of medians is also equal to 2. Thus, the median value of the array (e.g., the new median parameter value) is equal to 2 because the median of medians value is equal to the second median parameter value.

If the median of medians value is not equal to (e.g., is greater than or less than) the second median parameter value, then filter device 210 may determine a final set of parameter values that includes the comparison set and the portion of the subset of parameter values (e.g., the first subset or the second subset, depending on whether the median of medians value is greater than or less than the second median parameter value). For example, given the following array of sorted parameter values:

$$\begin{bmatrix} 1 & 1 & 1 \\ 4 & 6 & 8 \\ 5 & 9 & 9 \end{bmatrix},$$

the median of medians value (e.g., the center value) is equal to 6. The median value of the comparison set {1, 5, 6} (e.g., the second median parameter value) is equal to 5.

Because the median of medians value (6) is greater than the second median parameter value (5), filter device 210 may determine that the first subset of parameter values {1, 4, 1} (e.g., the upper left hand corner) is to be included in the comparison set. In some implementations, filter device 210 may sort the first subset of parameter values as {1, 1, 4}. The final set may include the comparison set of {1, 5, 6} and the first subset of {1, 1, 4}, which filter device 210 may merge and sort (e.g., using a merge sorting algorithm), as described below.

As further shown in FIG. 6, process 600 may include sorting a quantity of parameter values included in the final set to determine a new median parameter value of the multiple sets of parameter values (block 690). For example, filter device 210 may sort a quantity of parameter values included in the final set to determine the new median parameter value for the array of parameter values. In some implementations, the quantity of parameter values sorted by filter device 210 may be less than the total quantity of parameter values included in the final set. In this way, filter device 210 may conserve computing resources when determining the new median value. In some implementations, filter device 210 may sort the quantity of parameter values using a merge sorting algorithm.

In some implementations, filter device 210 may determine the quantity of parameter values to sort based on a quantity of elements included in a column of the array (e.g., and/or a quantity of elements included in a row of the array, a quantity of elements included in a first dimension, a quantity of elements included in a second dimension, etc.). In some implementations, filter device 210 may determine the quantity of parameter values to sort using the following expression:

$$\mathrm{ceil}\left(\frac{N^2}{2}\right) - \left[\mathrm{ceil}\left(\frac{N}{2}\right)\right]^2 + 1.$$

In the above expression, ceil may represent a mathematical operation that rounds a mathematical value that includes a fraction and/or decimal up to the nearest integer (or returns the mathematical value if the mathematical value does not include a fractional and/or decimal value). The term "N" may represent a quantity of elements included in a column of the array (e.g., and/or a quantity of elements included in a row of the array, a quantity of elements included in a first dimension, a quantity of elements included in a second dimension, etc.). For example, in an m×n (row×column) array, the value of N may be equal to the value of n.

In some implementations, filter device 210 may determine a direction in which to sort the final set (e.g., ascending or descending) based on the portion of the subset of parameter values included in final set. For example, if the first subset of parameter values is included in the final set (e.g., parameter values that are less than or equal to the median of medians), then filter device 210 may sort the final set in descending order. Conversely, if the second subset of parameter values is included in the final set (e.g., parameter values that are greater than or equal to the median of medians), then filter device 210 may sort the final set in ascending order.

Filter device 210 may sort the final set in ascending order or descending order, and may only sort a quantity of elements according to the expression described above. After sorting the quantity of elements, filter device 210 may determine that the last sorted element (e.g., the highest valued element in ascending order or the lowest valued element in descending order) is the new median parameter value of the multiple sets of parameter values. For example, if filter device 210 determines that the value of the expression is x, and the final set is to be sorted in ascending order due to the second subset being included in the final set, then filter device 210 may determine that the xth element in ascending order is the new median parameter value.

For example, given the following array of sorted parameter values:

$$\begin{bmatrix} 1 & 1 & 1 \\ 4 & 6 & 8 \\ 5 & 9 & 9 \end{bmatrix},$$

the final set was determined above to include the values {1, 5, 6, 1, 1, 4}. The first subset {1, 1, 4} was included in the final set, so filter device 210 is to sort the final set in descending order. The value of N is 3 (e.g., 3 columns in the array). Thus, the value of the expression is 2, as shown below:

$$\operatorname{ceil}\left(\frac{N^2}{2}\right) - \left[\operatorname{ceil}\left(\frac{N}{2}\right)\right]^2 + 1 =$$

$$\operatorname{ceil}\left(\frac{3^2}{2}\right) - \left[\operatorname{ceil}\left(\frac{3}{2}\right)\right]^2 + 1 = \operatorname{ceil}(4.5) - [\operatorname{ceil}(1.5)]^2 + 1 = 5 - 4 + 1 = 2.$$

Thus, filter device 210 is to sort the final set {1, 5, 6, 1, 1, 4} in descending order (e.g., using a merge sorting algorithm) until the $2^{nd}$ element in descending order is determined. The $2^{nd}$ element will be the new median parameter value of the array. Thus, filter device 210 is to sort the final set until the sorted set of {6, 5} is determined. Filter device 210 is to designate the value of 5 as the new median parameter value of the array of parameter values. As can be seen, the entire array of sorted parameter values is {1, 1, 1, 4, 5, 6, 8, 9, 9}, which has 5 as a median value.

An example has been provided above with respect to process 600. The provided example describes sorting parameter values with respect to a particular dimension (e.g., sorting within a column, rearranging the columns, etc.) and with respect to a particular direction (e.g., ascending from top to bottom of a column, ascending from left to right across multiple columns, etc.). It is to be understood that process 600 may be performed in a similar manner with respect to other dimensions (e.g., a row, a first dimension, a second dimension, a third dimension, etc.) and with respect to other sorting directions (e.g., descending from top to bottom, etc.).

Although FIG. 6 shows example blocks of process 600, in some implementations, process 600 may include additional blocks, different blocks, fewer blocks, and/or differently arranged blocks than those depicted in FIG. 6. Additionally, or alternatively, one or more of the blocks of process 600 may be performed in parallel.

FIGS. 7A-7D are diagrams of an example implementation 700 relating to example process 600 shown in FIG. 6. In example implementation 700, assume that filter device 210 processes an image by determining a median parameter value for a 5×5 array of pixels.

Figure 7A:
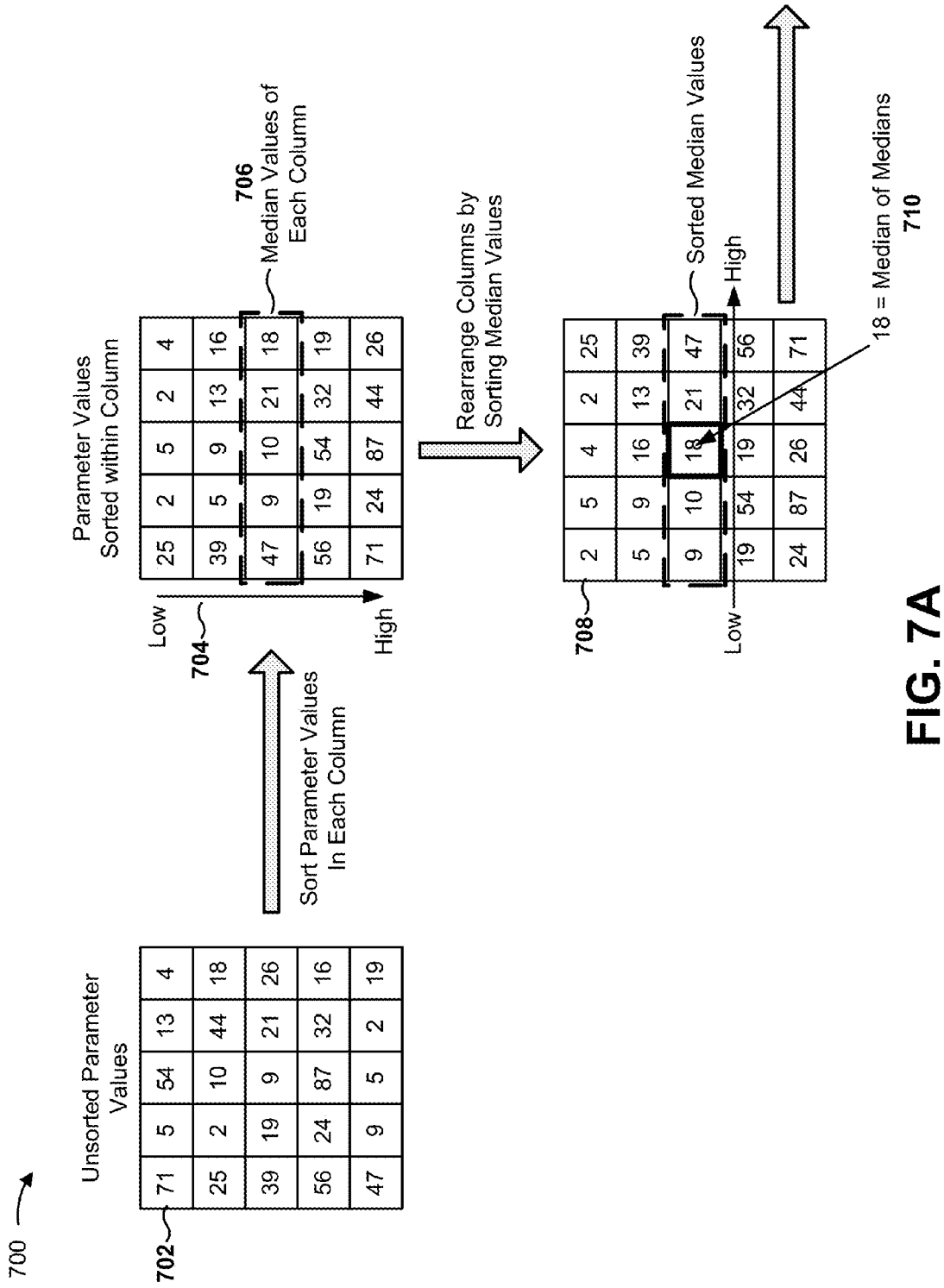
FIGS. 7A-7D are diagrams of an example implementation relating to the example process shown in FIG. 6.

As shown in FIG. 7A, assume that the 5×5 array of pixels is associated with a 5×5 array of parameter values shown by reference number 702. A location of each parameter value in the array shown by reference number 702 corresponds to a location of a pixel in an array of pixels included in the image being processed. As shown by reference number 704, filter device 210 may sort the parameter values within each column. As shown, assume that filter device 210 sorts the parameter values within a single column in ascending order from top to bottom (e.g., from the first row to the fifth row). Once filter device 210 has sorted the parameter values within each column, the middle row of parameter values (e.g., row three) corresponds to the median values of each column, as shown by reference number 706.

As shown by reference number 708, assume that filter device 210 rearranges (e.g., sorts) the columns so that the median values of each column are sorted in ascending order from left to right. As shown by reference number 710, once filter device 210 has rearranged the columns, the central value of the array, shown as having a value of 18, is the median of medians.

Figure 7B:
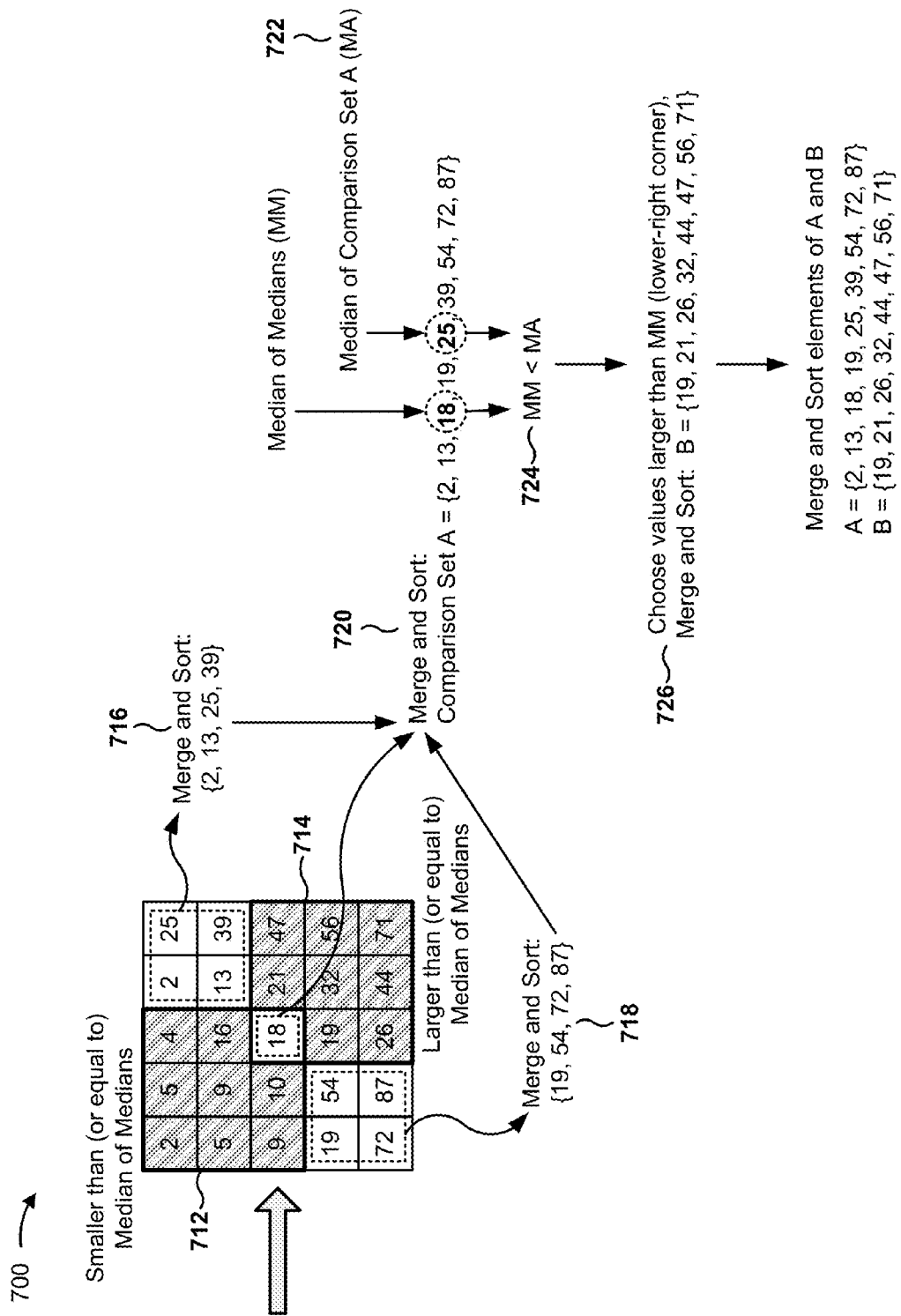

As shown in FIG. 7B, filter device 210 may determine, based on a position of parameter values in the array, a first subset of parameter values that are less than or equal to the median of medians, shown by reference number 712. As shown, the first subset includes all values above the median of medians in the same column (e.g., 4 and 16), all values to the left of the median of medians in the same row (e.g., 9 and 10), and all values that are both above and to the left of the median of medians (e.g., 2, 5, 5, and 9).

As further shown, filter device 210 may determine, based on a position of parameter values in the array, a second subset of parameter values that are greater than or equal to the median of medians, shown by reference number 714. As shown, the second subset includes all values below the median of medians in the same column (e.g., 19 and 26), all values to the right of the median of medians in the same row (e.g., 21 and 47), and all values that are both below and to the right of the median of medians (e.g., 32, 56, 44, and 71).

As shown by reference number 716, filter device 210 may merge and sort the values from the upper right hand corner of the array (e.g., {2, 13, 25, 39}) that are not included in the first subset or the second subset. As shown by reference number 718, filter device 210 may merge and sort the values from the lower left hand corner of the array (e.g., {19, 54, 72, 87}) that are not included in the first subset or the second subset. As shown by reference number 720, filter device 210 may merge and sort these two sets along with the median of medians value to form a comparison set A, represented as {2, 13, 18, 19, 25, 39, 54, 72, 87}.

As shown by reference number 722, filter device 210 may determine a median value of comparison set A. Assume that the median value of comparison set A (shown as MA) is 25, as shown, and the median of medians value (shown as MM) is 18, as shown. Filter device 210 may compare these values to determine that the median of medians value is less than the median value of comparison set A, as shown by reference number 724. As shown by reference number 726, based on the comparison, filter device 210 may choose the values from the second subset (e.g., the lower right hand corner of the array), and may sort the values from the second subset to form a set identified as B, represented as {19, 21, 26, 32, 44, 47, 56, 71}. Filter device 210 may merge a particular quantity of elements from sets A and B, and may sort the particular quantity of elements in a particular direction (e.g., ascending or descending).

Figure 7C:
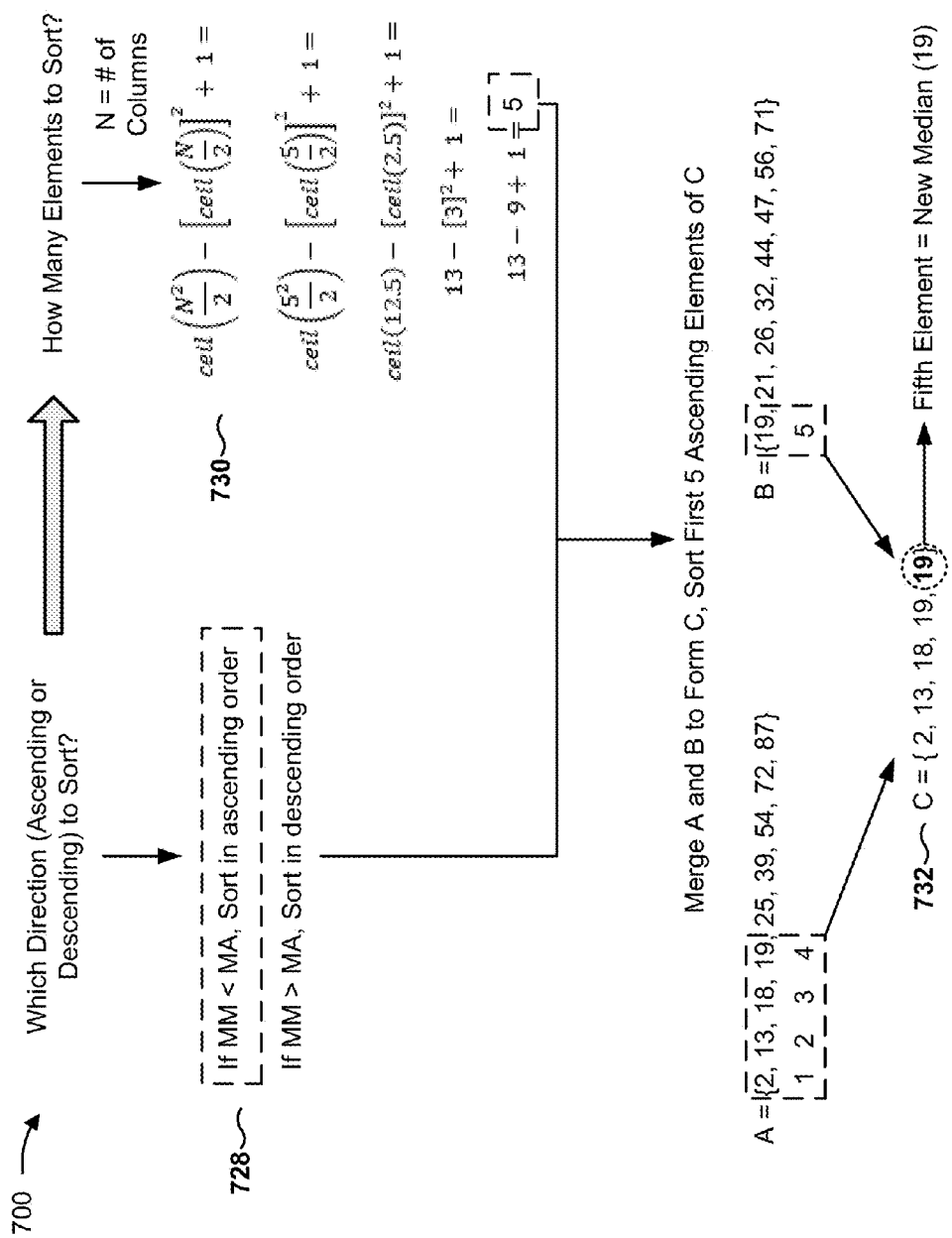

As shown in FIG. 7C (reference number 728), filter device 210 may determine a particular direction in which to sort based on the comparison of the median of medians value ("MM") and the median value of comparison set A ("MA"). For example, since MM is less than MA, assume that filter device 210 determines to sort the final set (e.g., that includes the elements of set A and set B) in ascending order.

As shown by reference number 730, filter device 210 may determine a particular quantity of elements to sort based on a size of the array and/or a quantity of elements included in a particular dimension of the array. For example, assume that filter device 210 determines the particular quantity of elements, N, to sort based on a quantity of columns included in the array (e.g., a quantity of elements included in a row of the array). In example implementation 700, N is equal to 5. Assume that for example implementation 700, filter device 210 determines the particular quantity of elements to sort based on evaluating the following expression:

$$\text{ceil}\left(\frac{N^2}{2}\right) - \left[\text{ceil}\left(\frac{N}{2}\right)\right]^2 + 1 =$$

$$\text{ceil}\left(\frac{5^2}{2}\right) - \left[\text{ceil}\left(\frac{5}{2}\right)\right]^2 + 1 = \text{ceil}(12.5) - [\text{ceil}(2.5)]^2 + 1 = 13 - 9 + 1 = 5.$$

Thus, filter device 210 is to determine the first five ascending elements (e.g., from lowest to highest) included in sets A and B. As shown by reference number 732, the first five ascending elements of sets A and B are {2, 13, 18, 19, 19}. The fifth element, 19, represents the new median parameter value of the 5×5 array of parameter values.

Figure 7D:
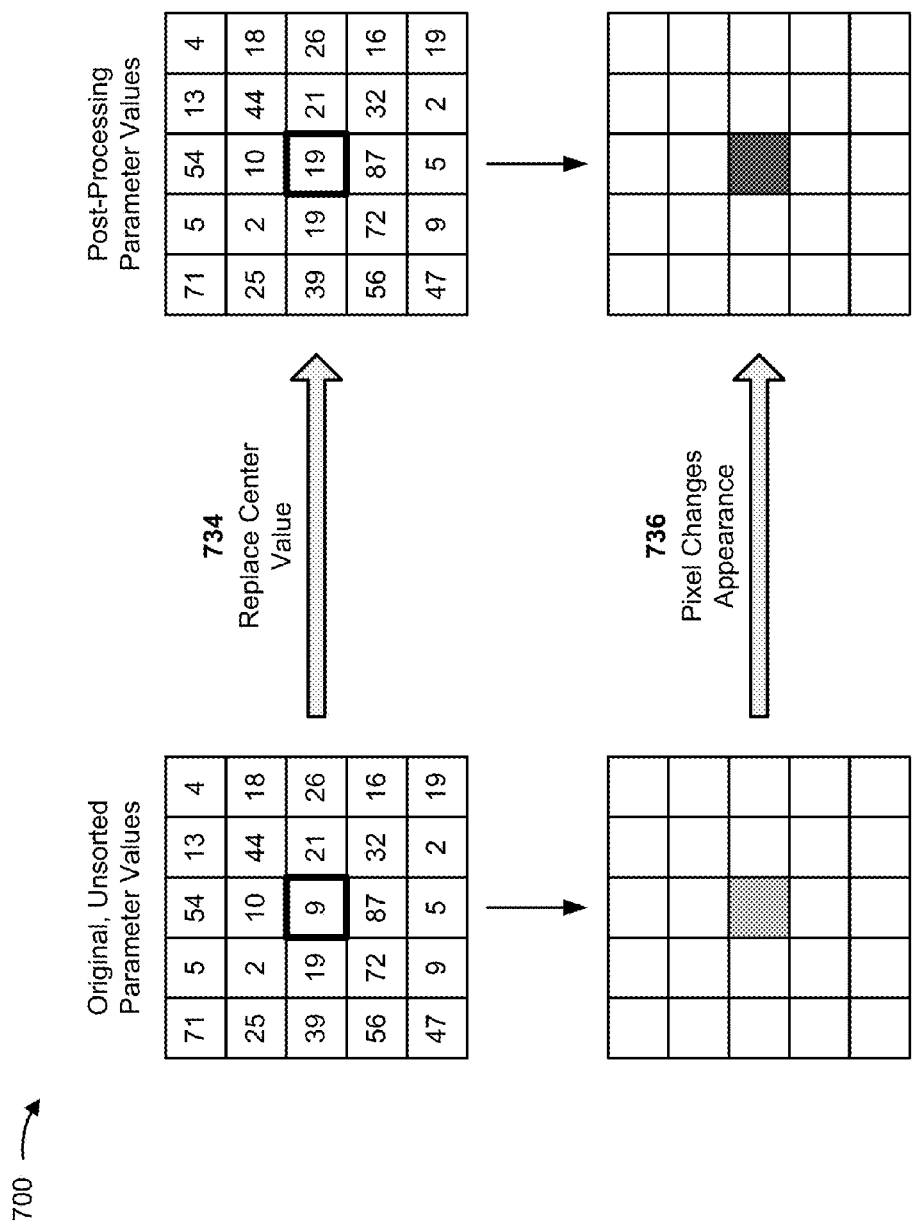

As shown in FIG. 7D (reference number 734), filter device 210 may replace the central value of the original, unsorted 5×5 array of parameter values, shown as having a value of 9, with the new median parameter value, shown as having a value of 19. As shown by reference number 736, replacing the original central parameter value with the new median parameter value causes the corresponding central pixel to change intensity (e.g., become darker).

As indicated above, FIGS. 7A-7D are provided as an example. Other examples are possible and may differ from what was described with regard to FIGS. 7A-7D.

Implementations described herein may permit a filter device (e.g., an image processing device) to more efficiently process an image using fewer hardware resources. For example, implementations described herein may allow a filter device to apply a median filter to an image using a smaller number of comparisons to determine a median value than other techniques.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, a "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
   determine a plurality of sets of parameter values associated with an array of pixels,
   each set of parameter values corresponding to a set of pixels, included in the array of pixels, that are aligned along a first dimension of the array;
   sort the plurality of sets of parameter values;
   determine, based on the sorting, a comparison set of parameter values, of the plurality of sets of parameter values, that excludes a subset of parameter values included in the plurality of sets of parameter values;
   determine a median value of the comparison set;
   determine, based on the median value, a final set of parameter values that includes the comparison set and a portion of the excluded subset;
   sort a quantity of parameter values included in the final set to determine a new median value of the plurality of sets of parameter values,
   the quantity of parameter values being based on a number of the plurality of sets of parameter values associated with the array of pixels,
   the quantity of parameter values being less than a total quantity of parameter values included in the final set; and
   provide the new median value.

2. The device of claim 1, where the one or more processors, when providing the new median value, are further to:
   replace a parameter value of interest, associated with a pixel of interest included in the array of pixels, with the new median value.

3. The device of claim 1, where the one or more processors, when sorting the plurality of sets of parameter values, are further to:
   determine a set of first median parameter values corresponding to the sets of parameter values; and
   sort the plurality of sets of parameter values based on determining the set of first median parameter values.

4. The device of claim 1, where the median value is a first median value; and
   where the one or more processors are further to:
   determine a set of second median values corresponding to each of the plurality of sets of parameter values;
   determine a median of medians value,
   the median of medians value being a median value of the set of second median values;
   compare the median of medians value to the first median value; and
   where the one or more processors, when determining the final set, are further to:
   determine the final set based on comparing the median of medians value to the first median value.

5. The device of claim 4, where the one or more processors are further to:
   determine the excluded subset of parameter values based on a position of the subset of parameter values in the sorted plurality of sets of parameter values,
   where the excluded subset of parameter values includes a first subset of parameter values less than or equal to the median of medians value and a second subset of parameter values greater than or equal to the median of medians value; and where the one or more processors, when determining the final set, are further to:
include one of the first subset or the second subset in the final set.

6. The device of claim 1, where the quantity of parameter values is based on a size of the array of pixels.

7. The device of claim 1, where the plurality of sets of parameter values represent an intensity of corresponding pixels included in the array of pixels.

8. A device, comprising:
one or more processors to:
determine a plurality of sets of parameter values associated with an array of pixels to be used to process an image,
each set of parameter values corresponding to a set of pixels, included in the array of pixels, that are aligned along a first dimension of the array of pixels;
determine a set of median values corresponding to each of the plurality of sets of parameter values;
determine a median of medians value,
the median of medians value being a median of the set of median values;
exclude a portion of parameter values, included in the plurality of sets of parameter values, from a comparison set used to determine an overall median value of the plurality of sets of parameter values;
determine a first median parameter value of the comparison set;
determine the overall median value based on comparing the first median parameter value and the median of medians value, and based on a number of the plurality of sets of parameter values associated with the array of pixels; and
provide the overall median value.

9. The device of claim 8, where the one or more processors, when providing the overall median value, are further to:
replace a parameter value of interest, associated with a pixel of interest included in the array of pixels, with the overall median value.

10. The device of claim 8, where the one or more processors are further to:
store a portion of the plurality of sets of parameter values;
add a new set of parameter values to the plurality of sets of parameter values; and
where the one or more processors, when determining the overall median value, are further to:
determine the overall median value for the stored portion of the plurality of sets of parameter values and the new set of parameter values.

11. The device of claim 8, where the one or more processors, when determining the overall median value, are further to:
determine the overall median value based on performing at least one of:
a basic sorting algorithm;
a merge sorting algorithm; or
a linear median sorting algorithm.

12. The device of claim 11, where the one or more processors are further to:
perform the basic sorting algorithm, where the basic sorting algorithm comprises at least one of:
a best known sorting network algorithm; or
a bubble sort.

13. The device of claim 11, where the one or more processors are further to:

perform the merge sorting algorithm, where the merge sorting algorithm comprises at least one of:
an odd-even merge sorting algorithm; or
an insertion sort.

14. The device of claim 11, where the one or more processors are further to:
perform the linear median sorting algorithm; and
where the one or more processors, when performing the linear median sorting algorithm, are further to:
divide the plurality of sets of parameter values into a first subset, a second subset, and the comparison set, based on determining the median of medians value.

15. A method, comprising:
determining a plurality of sets of parameter values associated with an array of scalar values,
each set of parameter values corresponding to a set of scalar values, included in the array of scalar values, that are aligned along a first dimension of the array,
the determining the plurality of sets being performed by a device;
sorting the plurality of sets of parameter values,
the sorting the plurality of sets being performed by the device;
determining, based on the sorting, a comparison set of parameter values, of the plurality of sets of parameter values, that excludes a subset of parameter values included in the plurality of sets of parameter values,
the determining the comparison set being performed by the device;
determining a median value of the comparison set,
the determining the median value being performed by the device;
determining, based on the median value, a final set of parameter values that includes the comparison set and a portion of the excluded subset,
the determining the final set being performed by the device;
sorting a quantity of parameter values included in the final set to determine a new median value of the plurality of sets of parameter values,
the quantity of parameter values being based on a number of the plurality of sets of parameter values associated with the array of scalar values,
the quantity of parameter values being less than a total quantity of parameter values included in the final set,
the sorting the quantity of parameter values being performed by the device; and
providing the new median value,
the providing the new median value being performed by the device.

16. The method of claim 15, where providing the new median value further comprises:
replacing a parameter value of interest, associated with a scalar value of interest included in the array of scalar values, with the new median value.

17. The method of claim 15, where the scalar value includes at least one of:
a picture element;
a volume element; or
a surface element.

18. The method of claim 15, where sorting the plurality of sets of parameter values further comprises:
determining a set of median parameter values for each of the plurality of sets of parameter values; and
sorting the plurality of sets of parameter values based on determining the set of median parameter values.

19. The method of claim 15, where the median value is a first median value; and
where the method further comprises:
determining a set of second median values corresponding to each of the plurality of sets of parameter values;
determining a median of medians value,
the median of medians value being a median value of the set of second median values;
comparing the median of medians value to the first median value; and
where determining the final set further comprises:
determining the final set based on comparing the median of medians value to the first median value.

20. The method of claim 19, where the excluded subset of parameter values includes a first subset of parameter values less than or equal to the median of medians value and a second subset of parameter values greater than or equal to the median of medians value; and
where determining the final set further comprises:
including one of the first subset or the second subset in the final set.

* * * * *